J. N. BANE.
ANIMAL TRAP.
APPLICATION FILED MAR. 18, 1916.
1,247,204.
Patented Nov. 20, 1917.
3 SHEETS—SHEET 3.
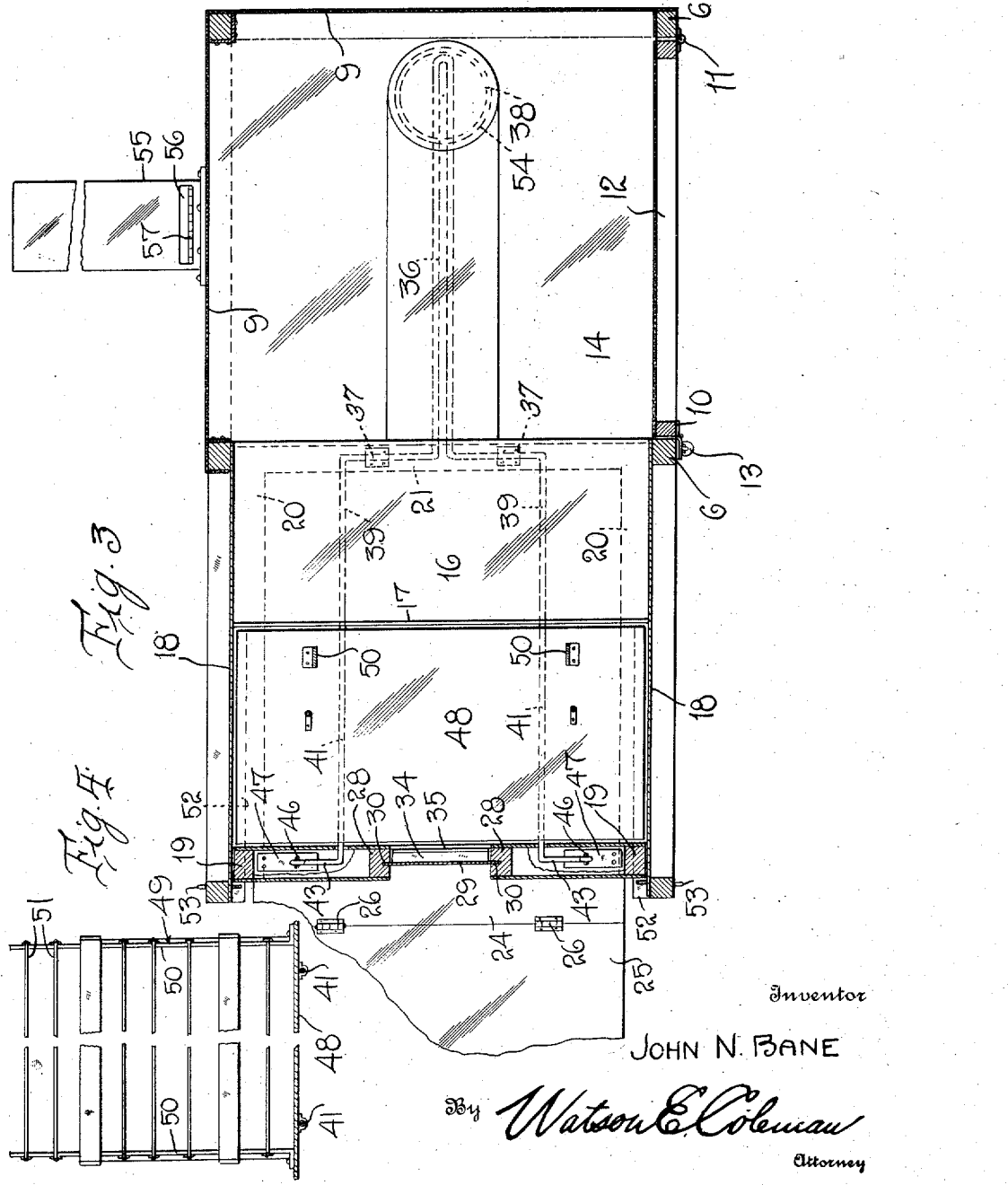

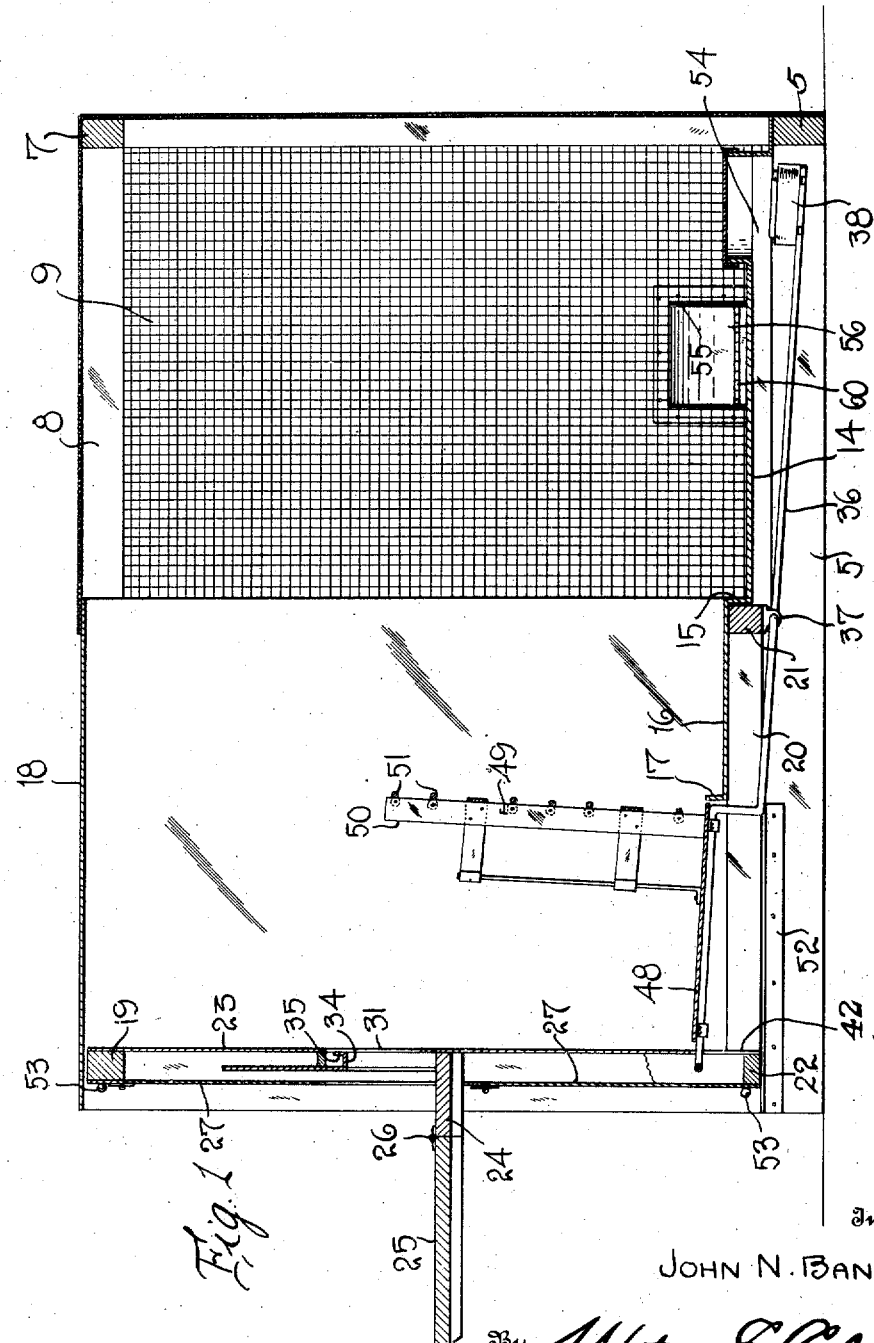

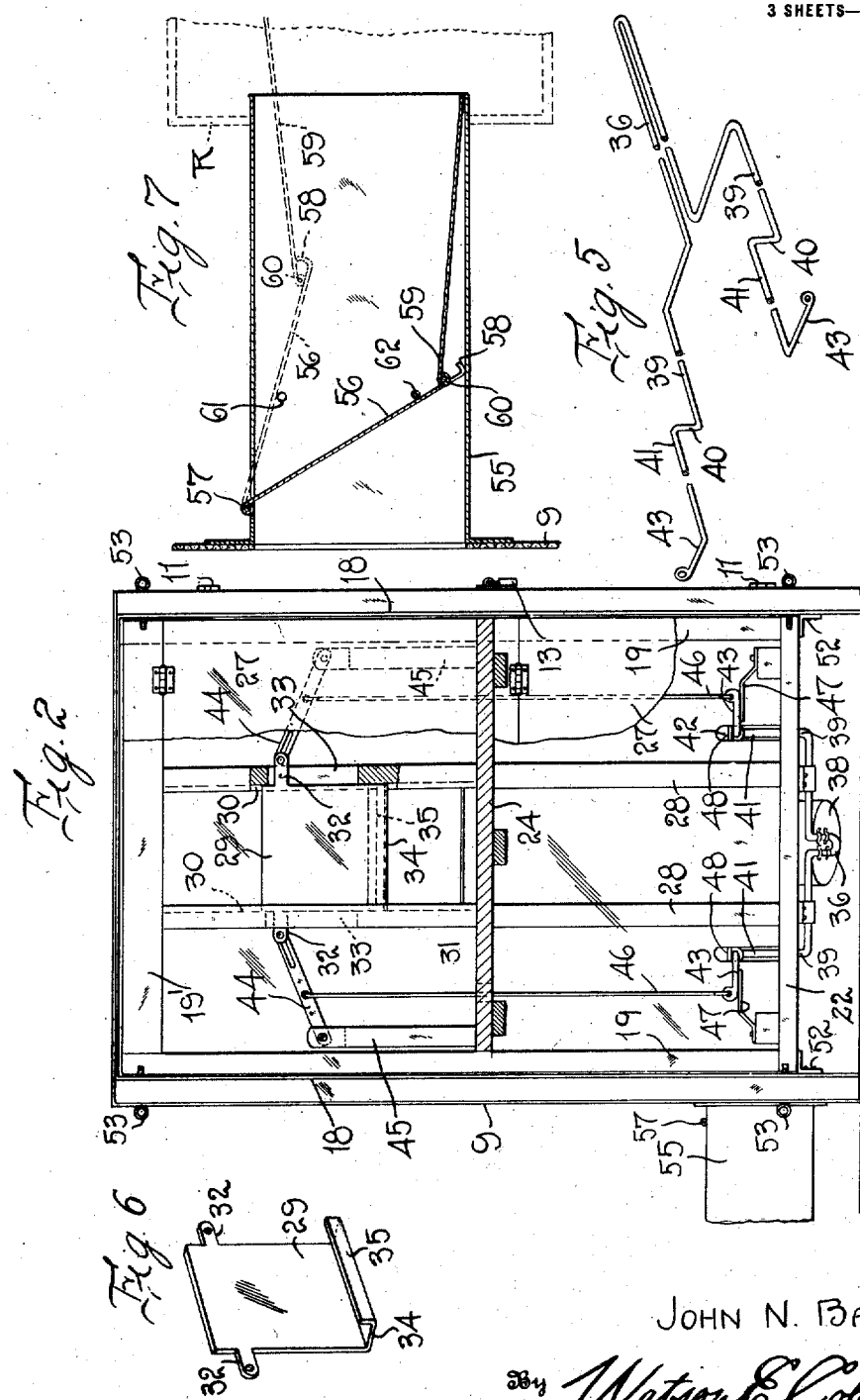

UNITED STATES PATENT OFFICE.

JOHN N. BANE, OF SOUTH BOSTON, VIRGINIA.

ANIMAL-TRAP.

1,247,204.

Specification of Letters Patent. Patented Nov. 20, 1917.

Application filed March 18, 1916. Serial No. 85,161.

*To all whom it may concern:*

Be it known that I, JOHN N. BANE, citizen of the United States, residing at South Boston, in the county of Halifax and State of Virginia, have invented certain new and useful Improvements in Animal-Traps, of which the following is a specification, reference being had to the accompanying drawings.

This invention relates to an improved animal trap and has for its primary object to provide a trap primarily designed for the purpose of catching rats and similar small animals, which will be highly effective and reliable in its operation.

It is another and more particular object of the invention to provide a trap of the above character, by means of which any number of animals may be successively trapped, and means which will operate to effectually prevent the escape of the animals first trapped.

It is one of the more specific objects of my invention to provide a trap body including a cage having reticulated walls, a pivotally mounted wire frame weighted at one end, a tread plate secured upon the other end of the frame, the front wall of the body having an entrance opening and a vertically movable door to close the same, and operative connections between the door and the latter end of said pivoted frame whereby the weight of the animal upon the tread plate oscillates the frame and moves the door to its closed position.

It is still another general object of the invention to provide a trap as above described, which consists of relatively few parts of simple construction whereby the trap may be produced at small manufacturing cost and will be very convenient and serviceable for the purpose in view.

With the above and other objects in view, my invention consists in the novel features of construction, combination and arrangement of parts to be hereinafter more fully described, claimed and illustrated in the accompanying drawings, in which, Figure 1 is a vertical longitudinal sectional view through a trap constructed in accordance with the preferred embodiment of my invention;

Fig. 2 is a front end elevation partly in section;

Fig. 3 is a plan view, the walls of the trap body and the door structure being shown in section;

Fig. 4 is a detail elevation of the vertical barrier mounted upon the tread plate;

Fig. 5 is a detail perspective view of the pivoted frame rod;

Fig. 6 is a similar view of the vertically movable door;

Fig. 7 is an enlarged detail section through the outlet passage and closure plate therefor, whereby the animal may pass from the trap into another compartment.

Referring in detail to the drawings, 5 designates the marginal base frame upon which spaced vertical uprights 6 are suitably mounted and secured. The upper ends of the rear pair of uprights 6 are connected by a transverse bar 7, and longitudinal bars 8 also connect the rear uprights 6 to the upper ends of the intermediate pair of uprights. Upon the frame bars 5, 6, 7 and 8, reticulated wire mesh fabric 9 is suitably secured to provide a side, top and rear end wall. A door, indicated at 10, is hingedly mounted in the opposite side of the frame structure, as at 11, and is also provided with a wall of reticulated material 12. This door is provided on its free edge with a suitable hasp which may be connected and locked to a staple in one of the posts or uprights 6, as shown at 13. By the provision of this door, the bait may be readily placed within the trap upon the floor or base plate 14. This plate extends longitudinally of the trap body and is provided with a vertical offset 15 therein from which the end portion 16 of said plate extends forwardly of the intermediate pair of posts or uprights 6 and terminates in an upstanding flange 17.

The top and side walls of the forward end of the trap body are formed from a single sheet metal plate 18 which is properly bent and disposed within and between the forward end uprights and the intermediate pair of uprights 6, as clearly shown in Fig. 3, and suitably secured thereto.

19 designates the spaced parallel vertical posts or uprights of a movable frame, said posts being connected by a frame bar 19' at their upper ends and fixed at their lower ends to horizontally disposed frame bars 20 which extend in parallel relation to each other and are connected at their rear ends by a cross bar 21 and at their forward ends by the transverse bar or beam 22. Spaced vertical metal walls 23 are suitably secured to the bars 19 and 22, and to these walls, intermediate of their upper and lower ends, an outwardly projecting bar 24 is fixed, to which a platform 25 is hingedly connected as at 26. Above and below the bar 24, the front wall 23 is provided with a hinged door 27. Parallel vertical bars 28 are arranged between the spaced walls 23 and connect the upper and lower bars 19 and 22. Above the platform 25, a vertically movable door or closure 29 is slidably mounted in the grooves or channels 30 provided in the inner faces of the bars 28. Each of the walls 23 is formed with a rectangular entrance opening 31, said opening in the inner wall being closed by the door when the latter is in a lowered position in contact with the bar 24. The door 29 is provided upon its upper end with the laterally projecting arms 32 movable in slots 33 in the bar 28. The lower edge of this metal door plate is horizontally projected inwardly, as at 34, and formed on its edge with an upstanding flange 35, the purpose of which will be later referred to.

Upon the rear connecting bar 21, a frame rod indicated generally by the numeral 36, is fulcrumed for oscillatory movement in spaced bearings 37. The medial portion of this frame rod is bent upon itself and projects rearwardly from the bearings 37, and upon the same, at its rear end, a suitable weight 38 is secured. The forwardly projecting end portions of the rod 39 are spaced some distance apart and are each provided with a vertical offset 40 therein so that the corresponding end portions 41 of said frame rod will be disposed above the plane of the rear portion of the frame. These latter portions 41 of the frame rod extend through vertical slots 42 formed in the lower end of the inner vertical wall 23 and the terminals of said frame rod are angularly disposed and outwardly extended between the spaced walls 23, as indicated at 43. Links 44 are arranged upon opposite sides of the vertically movable door 29 between the spaced walls 23, and are fulcrumed at their outer ends in the upper ends of the fixed posts or bearing standards 45. The inner ends of the respective links are slotted and operatively connected to the laterally projecting arms 32 on the door. Vertical rods 46 are movable through openings in the bar 24 and are connected at their lower ends to the terminals 43 of the oscillatory frame rod and at their upper ends to the medial portions of the respective links 44. A leaf spring 47 is arranged between the walls 23 contiguous to each terminal 43 of the frame rod and bears at its free end against said terminal, exerting an upward pressure thereon whereby to force the rods 46 upwardly and thereby accelerate the return of the door to its normal elevated position and assist the action of the gravity movable weight 38.

The forward end portions 41 of the frame rod 36 are connected by a horizontal tread plate 48, and upon this plate a vertically disposed barrier 49, shown in detail in Fig. 4, is suitably secured. This barrier may be of any preferred construction, but preferably consists of the spaced vertical bars 50 connected by a series of spaced transverse rods 51. Upon the inner face of each side of the metal body wall 18, an angle bar 52 is fixed and extends longitudinally below the horizontal plane of the raised portion 16 of the floor 14 of the trap and terminates at its inner end substantially in line with the upstanding flange 17. The horizontal inwardly projecting flanges of these angle bars provide guides and supports for the removable frame structure carrying the spaced vertical walls 23, the door mechanism and the animal actuated operating means therefor. When this removable structure is mounted upon the body of the trap, the same is forced inwardly over the angle bars 52 until the rear transverse bar 21 abuts against the offset 15 on the floor 14 of the trap body. Pins indicated at 53 are now engaged through the opposite sides of the metal body wall 18 adjacent their upper and lower ends and over the front wall 23, thus holding the detachable or removable mechanism in its operative position with respect to the body of the trap. The floor or base wall 14, at its rear end, is provided with a raised hollow portion indicated at 54, to accommodate the rearwardly projecting portion of the frame rod 36 and the weight 38 thereon.

To one of the reticulated side walls of the trap body, a sheet metal outlet tube or passage 55 is secured at one of its ends around an opening in said wall, and within this outlet tube or passage a vertically swinging closure plate 56 is mounted, said plate being hinged at one end, as at 57, to the top wall of said tube. The free end of said plate 56 has an outturned flange 58 formed thereon, and adjacent to this flange a second plate 59 is hingedly connected to the plate 56, as indicated at 60. The flange 58 limits the pivotal movement of the plate 59 with respect to the plate 56 in one direction, as clearly shown in dotted lines in Fig. 7. One of the side walls of the metal tube 55 is provided with spaced openings 61 to receive a removable pin 62. When the plate 56 is disposed in its normal position and the pin 62 inserted through the lower opening 61 as shown in Fig. 7, said plate will be locked or held against movement so that the animal caught in the trap cannot pass through the tube 55. The plate 56 may be readily raised to the dotted line position shown in Fig. 7, by simply grasping the free end of the plate 59 and swinging the same outwardly from the end of the tube 55. When the plate 56 is thus elevated, the pin 62 is inserted through the upper opening 61 beneath the edge of said plate, whereby the two plates 56 and 59 are sustained in their raised positions so that the animal may pass through the tube 55. The animals, as they are trapped, pass through the tube 55, lifting the plates 56 and 59 into a separate compartment indicated at R. These plates immediately drop to their normal positions so as to prevent the return of the animal through the tube into the trap.

From the foregoing description, taken in connection with the accompanying drawing, the construction, manner of operation and several advantages of my invention will be clearly understood. The bait is arranged within the trap upon the floor 14 and 16 so that it will be visible through the reticulated walls 9 and opening 31 of the trap, and the animal enters the trap over the platform 25 through the openings 31 in the walls 23.

The animal enters the trap through the opening 31 by either jumping down upon the tread plate 48 or leaping over the barrier 49. In the former case, the weight of the animal upon the tread plate closes the door 29 and the animal passes around either side of the barrier which is spaced from the side walls of the trap body into the rear end of the trap in order to reach the bait on the floor 14. The animal cannot leap back over the barrier through the door opening, and if it treads upon the plate 48, the door will be immediately closed. If the animal should make an effort to escape by jumping from the plate 48, the flange 35 on the lower edge of the door will frustrate such efforts, as the weight of the animal clinging by its front paws to this flange would hold the door in its closed position. In this manner, it will be seen that a number of animals may be caught without having to manually reset the trap, and as the animals are caught they may pass from the trap body through the outlet or conduit 55 into the separate compartment R. My improved trap will, therefore, be very efficient and serviceable in practical use and is admirably adapted for the purposes in view. It is apparent that the trap can be constructed in various sizes and also of other shapes than that disclosed in the accompanying drawings. It will, therefore, be understood that I reserve the privilege of adopting all such legitimate changes as may be fairly embodied within the spirit and scope of the invention as claimed.

Having thus fully described my invention, what I desire to claim and secure by Letters Patent is:—

1. The combination with a trap body, of a frame, a vertical front wall secured upon said frame and having a door opening, a slidably mounted door to close said opening, animal actuated means mounted in the frame and operatively connected to the door to close the same when an animal enters the trap, guides on the trap body to receive and support said frame and the door structure in operative relation to the trap body, and means for retaining said frame and door structure in its applied position against movement upon the guides with respect to the trap body.

2. The combination with a trap body having a body wall, of a frame mounted beneath said body wall, a vertical front wall fixed to said frame having a door frame, a door to close said opening, a rod mounted to oscillate in said frame, a tread plate secured upon said rod and normally disposed above the plane of the floor and in advance thereof, a vertically disposed barrier secured upon said tread plate, and means operatively connecting the terminals of said rod to said door to move the door to its closed position under the weight of an animal on said tread plate.

3. An animal trap including a body having a horizontally disposed floor provided with a longitudinally offset forward end portion, a frame, a vertical front wall secured in said frame and provided with a door opening, a door to close said opening, means to detachably retain the frame and the door structure in operative relation to the trap body, said frame extending beneath the forward offset end of the floor, a rod fulcrumed upon said frame, a tread plate secured upon said rod and disposed in advance of the offset end of the floor, and means operatively connecting the ends of the rod to said door to move the same to its closed position under the weight of the animal on said tread plate.

4. A trap including a trap body having a horizontally disposed floor, spaced vertical front walls each having an entrance opening, a vertically slidable door mounted between said walls, a rod fulcrumed intermediate of its ends beneath the floor and having its rear end weighted, the forwardly projecting terminals of the rod extending between the spaced front walls, a tread plate fixed upon said rod, and means operatively connecting said rod terminals to the vertically movable door to move said door to its closed position under the weight of an animal on the tread plate.

5. A trap including a trap body having a horizontally disposed floor, a front wall having an entrance opening, a vertically slidable door to close said opening, a rod fulcrumed intermediate of its ends beneath the floor and having its rear end weighted, a tread plate fixed upon said rod, means operatively connecting said rod to the vertically movable door to move said door to its closed position under the weight of an animal on the tread plate, and leaf springs bearing upon said rod and operating to assist in moving the door to its open position.

6. A trap including a body having a horizontally disposed floor provided with a longitudinally offset forward end portion, a frame slidably mounted in the trap body and extending beneath said offset end of the floor, a vertical front wall carried by said frame having a door opening, a slidable door to close said opening, means for detachably holding said frame and the door structure in operative relation to the trap body, a rod fulcrumed intermediate of its ends upon said frame and extending rearwardly beneath the floor, a weight fixed to the rear end of said rod, a tread plate secured upon the rod and vertically movable in advance of the offset end of the floor, pivoted links connected to the door, means operatively connecting said links to the pivoted rod to move the door to its closed position under the weight of an animal on the tread plate, and means coöperating with said rod to normally hold the door in its open position.

In testimony whereof I hereunto affix my signature in the presence of two witnesses.

JOHN N. BANE.

Witnesses:
JOHN F. QUENSEN,
W. P. SHAPARD.

Copies of this patent may be obtained for five cents each, by addressing the "Commissioner of Patents, Washington, D. C."